US009423567B2

(12) United States Patent
Park

(10) Patent No.: US 9,423,567 B2

(45) Date of Patent: Aug. 23, 2016

(54) OPTICAL MODULE, INCLUDING A PRISM COVERED BY A HOUSING

(71) Applicant: Electronics and Telecommunications Research Institute, Daejeon (KR)

(72) Inventor: Sahnggi Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 159 days.

(21) Appl. No.: 14/170,684

(22) Filed: Feb. 3, 2014

(65) Prior Publication Data

US 2015/0010274 A1 Jan. 8, 2015

(30) Foreign Application Priority Data

Jul. 2, 2013 (KR) ........................ 10-2013-0077318

(51) Int. Cl.

*G02B 6/34* (2006.01)
*G02B 6/12* (2006.01)
*G02B 6/30* (2006.01)
*G02B 6/125* (2006.01)

(52) U.S. Cl.

CPC *G02B 6/34* (2013.01); *G02B 6/125* (2013.01); *G02B 6/305* (2013.01)

(58) Field of Classification Search

CPC .......... G02B 6/34; G02B 6/125; G02B 6/305; G02B 6/12004; G02B 6/29373; G02B 6/4214; G02B 2006/12114

USPC ...................................................... 385/36–40

See application file for complete search history.

(56) References Cited

U.S. PATENT DOCUMENTS 4,059,338 A 11/1977 Hartelius, Jr.
4,932,743 A * 6/1990 Isobe ...................... G02B 6/34 385/130
5,066,086 A * 11/1991 Angenent ............. G02F 1/3133 385/41
6,052,189 A * 4/2000 Fuse .................. G01B 11/0608 356/615
7,511,529 B1 * 3/2009 Dagher ............ H03K 19/00361 326/27
2002/0009274 A1 * 1/2002 Gharavi .................. G02F 1/065 385/122
2003/0207485 A1 11/2003 Johannessen
2007/0030866 A1 * 2/2007 Kim .......................... H01S 5/20 372/19
2007/0031088 A1 2/2007 Lu
2008/0002753 A1 * 1/2008 Timans ................ G01K 11/125 374/2
2011/0075970 A1 * 3/2011 Schrauwen ............ G02B 6/124 385/37

OTHER PUBLICATIONS

Sahnggi Park et al., "Si micro-ring MUX/DeMUX WDM filters", Optics Express, Jul. 4, 2011, vol. 19, No. 14.

Jacob S. Levy et al., "CMOS-compatible multiple-wavelength oscillator for on-chip optical interconnects", Nature Photonics, Jan. 2010, pp. 37-40, vol. 4.

Tymon Barwicz et al., "Microring-resonator-based add-drop filters in SiN: fabrication and analysis", Optics Express, Apr. 5, 2004, vol. 12, No. 7.

* cited by examiner

*Primary Examiner* — Akm Enayet Ullah

(74) *Attorney, Agent, or Firm* — Rabin & Berdo, P.C.

(57) ABSTRACT

Provided are an optical module, an optical communication apparatus, and an information processing system including the same. The optical module includes a lower clad layer, an optical waveguide extended in one direction on the lower clad layer, an optical device on the optical waveguide, a prism disposed between the optical device and the optical waveguide and having a higher refractive index than the optical waveguide, a housing covering the prism and the optical device, and an electrode layer adjacent to the prism and disposed between the housing and the optical waveguide.

8 Claims, 9 Drawing Sheets

100

82 80 70 72 79 96 96 62 50 84 92 θ 60 90 44 40 30 20 10 140

도파로 폭20㎛ 에 대해
1dB tolerance=7.2㎛

-1dB Tolerance=18.9㎛

OPTICAL MODULE, INCLUDING A PRISM COVERED BY A HOUSING

CROSS-REFERENCE TO RELATED APPLICATIONS

This U.S. non-provisional patent application claims priority under 35 U.S.C. §119 of Korean Patent Application No. 10-2013-0077318, filed on Jul. 2, 2013, the entire contents of which are hereby incorporated by reference.

BACKGROUND OF THE INVENTION

The present invention disclosed herein relates to a computer system, and more particularly, to an optical module realizing high coupling efficiency optical communication, an optical communication apparatus, and an information processing system.

As electronic devices have a tendency towards miniaturization and high speed performance, researches on increasing integrity of elements forming the electronic devices have been continuously performed. For the miniaturization and high speed performance of the electronic devices, not only miniaturization of the elements but also rapid signal delivery between the elements is necessary.

As one way for the rapid signal delivery between the elements, it is attempted to apply an optical communication technology to the electronic devices. When the optical communication technology is applied in the electronic devices, not only can signals be rapidly delivered, but limitations of typical signal delivery schemes, such as high resistance, heat generation and parasitic capacitance phenomena can also be alleviated.

Recently, researches on introducing fiber-optic communication technology in technical maturity stage into a computer are actively performed. Representatively, silicon photonics technologies use silicon materials as an optical waveguide in order to transmit an optical signal. Researches on directly using the existing fiber-optic communication technologies by inserting optical fibers into a printed circuit board (PCB) of a computer are also actively performed.

SUMMARY OF THE INVENTION

The present invention provides an optical module maximizing coupling efficiency, an optical communication apparatus, and an information processing system including the same.

The present invention also provides an optical module having high reliability on electrical and optical interconnections, an optical communication apparatus, and an information processing system.

Embodiments of the inventive concept provide optical modules including: a lower clad layer; an optical waveguide extended in one direction on the lower clad layer; an optical device on the optical waveguide; a prism disposed between the optical device and the optical waveguide, the prism having a higher refractive index than the optical waveguide; a housing covering the prism and the optical device; and an electrode layer adjacent to the prism and disposed between the housing and the optical waveguide.

In some embodiments, the optical module may further include bonding wires connecting the electrode layer and the optical device.

In other embodiments, the optical device may be coupled to an inclined surface of the prism and the optical device may include a vertical cavity surface emitting laser (VCSEL) or a photo diode.

In still other embodiments, the VCSEL and the photo diode may be disposed adjacent to the prism and comprise bonding pads connected to the bonding wires.

In even other embodiments, the prism may have a wedge shape that an inclination angle is formed in a direction which is opposite to the bonding pad and the bonding wires.

In yet other embodiments, the prism of wedge shape may include gallium phosphide or silicon.

In further embodiments, the optical module may further include a buffer layer disposed between the prism and the optical waveguide.

In still further embodiments, the buffer layer may include index matching oil or adhesives.

In even further embodiments, the optical module may further include an upper clad layer disposed between the optical waveguide and the electrode layer.

In other embodiments of the present invention, optical communication apparatuses include: a substrate comprising a sub control region, a connection region, and a sub-unit cell region thereon; sub-control units disposed on the sub control region; and sub-unit cells disposed on the sub-unit cell region and communicating with the sub-control units, wherein at least one of the sub-control units or the sub-unit cells comprise an optical module, and the optical module includes: a lower clad layer on the substrate; optical waveguides disposed on the lower clad layer, and extended from the sub-control units or the sub-unit cells to the connection region; optical devices on the optical waveguides in the sub-control region or the sub-unit cell region; a prism disposed between the optical devices and the optical waveguides, the prism having a higher refractive index than the optical waveguide; a housing covering the prism and the optical devices; and an electrode layer adjacent to the prism and disposed between the housing and the optical waveguides.

In some embodiments, the optical devices of the sub-control units may include first optical sources and first photo detectors, and the optical devices of the sub-unit cells comprises second photo detectors connected to the first optical sources, and second optical sources connected to the first detectors by means of the optical waveguides.

In other embodiments, the optical waveguides may include: first optical waveguides extended between the first optical sources and the second photo detectors; second optical waveguides connected between the first photo detectors and the second optical sources, wherein the first and second optical waveguides do not intersect with each other.

In still other embodiments, when the sub-control units are connected to the N sub-unit cells and configured with the N unit cells, the unit cells comprises $N^2$ sub-unit cells.

In even other embodiments, the optical communication apparatus may further include main control units connected to the N2 unit cells by means of the optical waveguides, wherein, when the main control units and the unit cells are configured with N upper-unit cells, the upper unit cells comprises N3 sub-unit cells.

In yet other embodiments, the optical communication apparatus may further include optical connectors connecting the optical waveguides.

In further embodiments, each of the optical connectors may include: a hexahedral prism on the optical waveguide; an upper optical waveguide layer on the hexahedral prism; a top lower clad layer on the upper optical waveguide layer; and a top substrate on the top lower clad layer.

In still further embodiments, the substrate may include silicon, and the optical waveguide comprises silicon nitride.

In even further embodiments, the optical communication apparatus may further include semiconductor devices disposed in the lower clad layer.

In still other embodiments of the present invention, information processing systems includes: a printed circuit bard (PCB); electromagnetic devices mounted on one side of the PCB; optical communication apparatuses connected to the electromagnetic devices and mounted another side of the PCB, wherein each of the optical communication apparatuses comprises: a substrate comprising a sub-control region, a connection region, and a sub-unit cell region thereon; sub-control units disposed on the sub-control region; and sub-unit cells disposed on the sub-unit cell region and communicating with the sub-control units, wherein at least one of the sub-control units or the sub-unit cells comprise an optical module, and the optical module comprises a lower clad layer on the substrate, optical waveguides disposed on the lower clad layer, and extended from the sub-control units or the sub-unit cells to the connection region, optical devices on the optical waveguides in the sub-control region or the sub-unit cell region, a prism disposed between the optical devices and the optical waveguides, the prism having a higher refractive index than the optical waveguide, a housing covering the prism and the optical devices, and an electrode layer adjacent to the prism and disposed between the housing and the optical waveguides.

In some embodiments, the information processing system may further include a central processing unit, a user interface, a memory, or a modem mounted on the substrate of the optical communication apparatus.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional and/or plan illustrations that are schematic illustrations of example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but may be to include deviations in shapes that result, for example, from manufacturing. For example, an implanted region illustrated as a rectangle may, typically, have rounded or curved features and/or a gradient of implant concentration at its edges rather than a binary change from implanted to non-implanted region. Thus, the regions illustrated in the figures are schematic in nature and their shapes may be not intended to illustrate the actual shape of a region of a device and are not intended to limit the scope of example embodiments.

Hereinafter, it will be described about an exemplary embodiment of the inventive concept in conjunction with the accompanying drawings.

Figure 1:
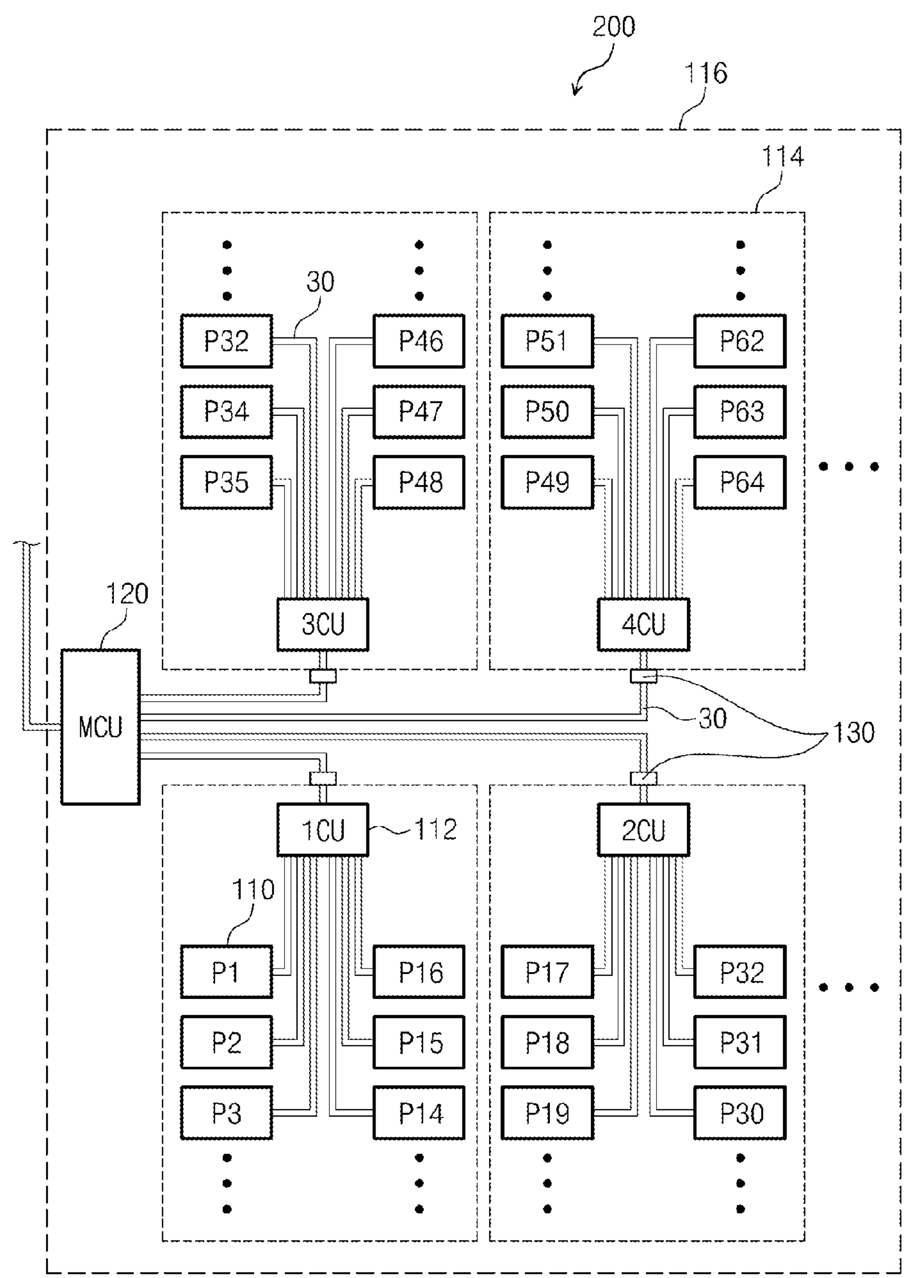
FIG. 1 schematically illustrates an optical communication apparatus according to an embodiment of the inventive concept.

FIG. 1 schematically illustrates an optical communication apparatus 200 according to an embodiment of the inventive concept. The optical communication system 200 according to an embodiment of the inventive concept may include a main control unit 120, sub-control units 112, sub-unit cells 110, optical waveguides 30, and optical connectors 130. The optical waveguides 30 may be sequentially connected to the main control unit 120, the sub-control units 112, and the sub-unit cells 110. The main control unit 120 may output control signals for controlling the sub-control units 112 and the sub-unit cells 110, and receive response signals. The sub-control units 112 communicate with the main control unit 120 and control the sub-unit cells 110. One sub-control unit 112 and 16 sub-unit cells 110 may form unit cells 114, respectively. The 16 unit cells 114 may include $16^2$ sub-unit cells 110. Also, one main control unit 120 and 16 unit cells 114 may form an upper unit cell 116. The upper unit cells 116 and hyper main control units (not shown) may form a high-dimensional unit cell. Accordingly, the optical communication apparatus 200 according to an embodiment of the inventive concept may be designed to include the n-th power of 16 sub-unit cells 110, where n is an integer, as a dimension of the unit cells 114 increases.

The sub-control units 112 may determine whether to output an optical signal to the main control unit 120 or the sub-unit cells 110. The main control unit 120, the sub-control units 112, and the sub-unit cells 110 may perform mutual conversion between an optical signal and an electrical signal.

The optical connectors 130 may connect the optical waveguides 30 between the main control unit 120 and the sub-unit cells 114. Lengths of the optical waveguides 30 may be extended by the optical connectors 130. Although not shown in the drawing, the optical connectors 130 may connect the optical waveguides 30 between the sub-control units 112 and the sub-unit cells 110 in the sub-unit cells 114. Description about the optical connectors 130 will be described in detail later.

Figure 2:
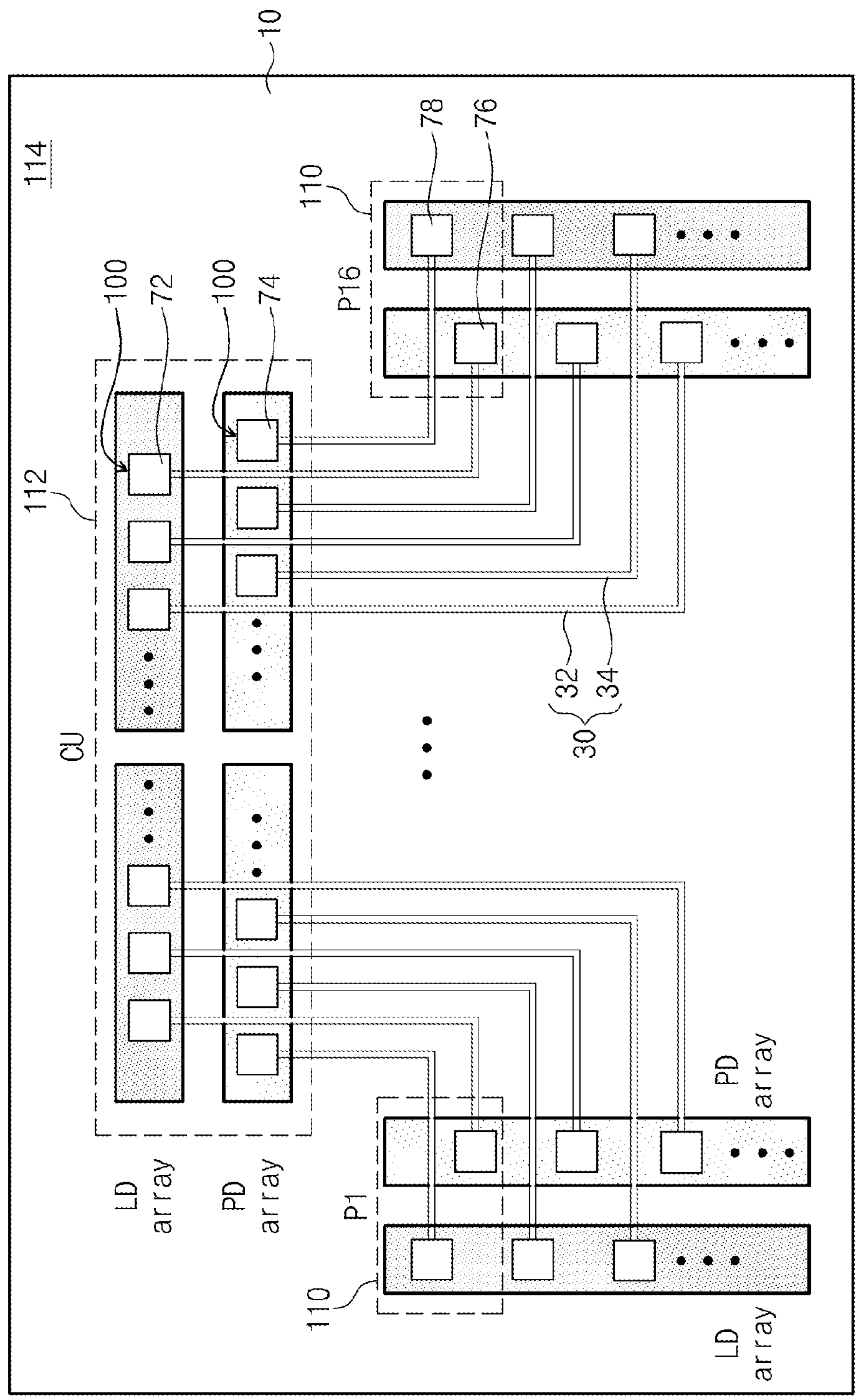
FIG. 2 is a plan view illustrating in detail sub-control units and sub unit cells of FIG. 1.

FIG. 2 is a plan view illustrating in detail the sub-control units 112 and the sub-unit cells 110 of FIG. 1.

Referring to FIGS. 1 and 2, the sub-control units 112 may include first optical sources 72 and first photo detectors 74. The sub-unit cells 110 may include second photo detectors 76 and second optical sources 78. The first optical sources 72, the first photo detectors 74, the second optical sources 78, and the second photo detectors 76 are the optical devices 70. The first and second optical sources 72 and 78 may include vertical cavity surface emitting lasers (VCSELs) or laser diodes. The first and second photo detectors 74 and 76 may include photo diodes. The first optical sources 72 and the second photo detectors 76 may be connected by the first optical waveguides 32. The first optical sources 72, the first optical waveguides 32, and the second photo detectors 76 may be first communication lines. Also, the second optical waveguides 34 may connect the first photo detectors 74 and the second optical sources 78. Also, the first photo detectors 74, the second optical waveguides 34, and the second optical sources 78 may be second communication lines. The first and optical waveguides 32 and 34 do not interest with each other, and may connect the sub-control units 112 and the sub-unit cells 110.

The sub-control units 112, the optical waveguides 30, and the sub-unit cells 110 may be mounted on the substrate 10. The substrate 10 may have a sub-control region, a connection region, and a sub-unit cell region. The sub-control region has the sub-control units 112 mounted therein. The sub-unit cell region has the sub-unit cells mounted therein. The connection region is a region between the sub-control region and the sub-unit cell region. The connection region may have the optical waveguides 30 disposed therein.

The optical devices 70 may be combined with the optical waveguides 30 to form the optical module 100. The optical waveguides 30 may connect the optical modules 100. The sub-control units 112 or the sub-unit cells 110 may have a plurality of optical modules 100 which receive and transmit optical signals.

Figure 3:
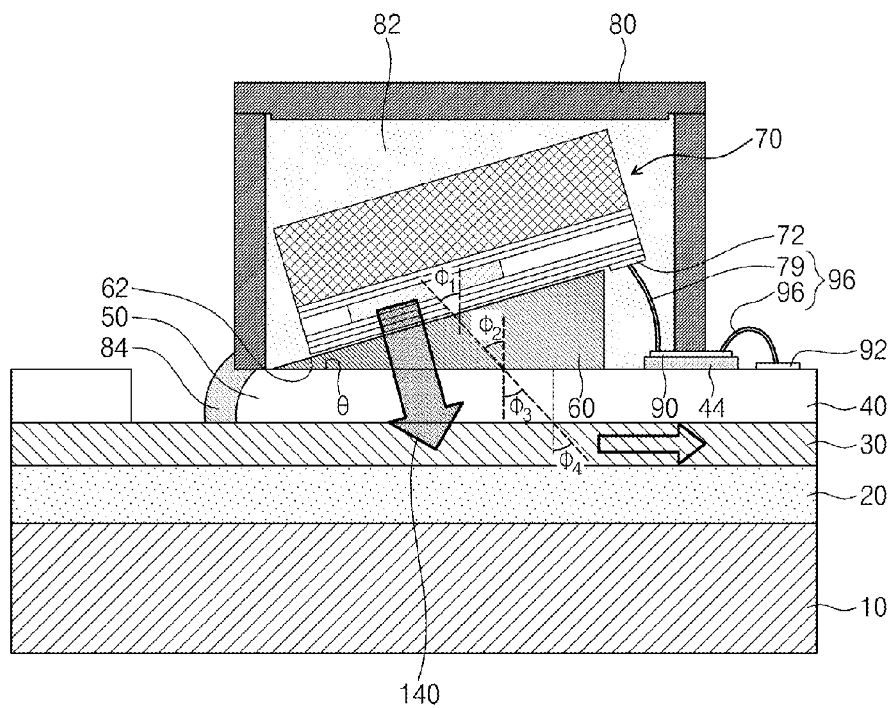
FIG. 3 is a cross-sectional view illustrating optical modules according to embodiments of the present invention.
Figure 4:
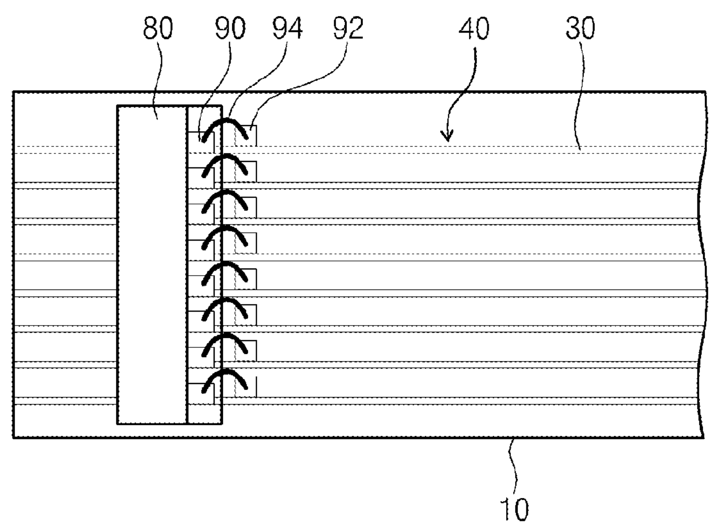
FIG. 4 is a plan view of FIG. 3.

FIG. 3 is a cross-sectional view illustrating the optical module 100 according to an embodiment of the inventive concept. FIG. 4 is a plan view of FIG. 3

Referring to FIGS. 1 to 4, the optical module 100 according to an embodiment of the inventive concept includes a substrate 10, a lower clad layer 20, an optical waveguide 30, an upper clad layer 40, a buffer layer 50, a prism 60, an optical device 70, a housing 80, an electrode layer 90, and bonding wires 96.

The substrate 10 may include crystalline silicon. The crystalline silicon may have a refractive index about 3.45. The lower clad layer 20 may be disposed on the substrate 10. The lower clad layer 20 may include silicon oxide. The silicon oxide may have a refractive index of about 1.45.

The optical waveguide 30 may be extended in one direction on the lower clad layer 20. The lower clad layer 20 may have a lower refractive index than the optical waveguide 30. The optical waveguide 30 may include silicon nitride or silicon oxynitride. The silicon nitride may have a refractive index of about 2.0. The silicon oxynitride may have a refractive index of about 1.7.

The upper clad layer 40 may cover one side of the optical waveguide 30. A refractive index of the upper clad layer 40 may be lower than that of the optical waveguide 30. The upper clad layer 40 may include silicon oxide.

The buffer layer 50 may be adjacent to the upper clad layer 40 and cover the other side of the optical waveguide 30. The buffer layer 50 may have higher refractive index than the optical waveguide 30. The buffer layer 50 may include an index matching oil or adhesives having a refractive index of about 1.7 to about 2.1.

The prism 60 may be disposed on the buffer layer 50. The buffer layer 50 may prevent the air from being flowed in between the prism 60 and the optical waveguide 30. The prism 60 may have higher refractive index than the buffer layer 50. This is because the air may disturb optical delivery between the prism 60 and the optical waveguide 30. The prism 60 may have a wedge shape including an inclined surface 62. An inclination angle θ of the prism 60 may correspond to an angle of refraction. The prism 60 may include crystalline silicon or gallium phosphide (GaP). The gallium phosphide may have a refractive index of about 3.05 in a crystalline structure. The prism 60 may also increase optical coupling between the optical device 70 and the optical waveguide 30. Also, the prism 60 may increase an alignment tolerance range of the optical waveguide 30. Accordingly, the optical module 100 according to an embodiment of the inventive concept may maximize reliability on optical interconnection.

The optical device 70 may be perpendicularly coupled to the inclined surface 62 of the prism 60. Moreover, the optical device 70 may have an device pad 71. The device pad 71 may be connected to the electrode layer 90 by a first bonding wire 79.

The housing 80 covers the prism 60 and optical device 70. Filling adhesives 82 may fill inside the housing 80. Also, sealing adhesives 84 may seal the buffer layer 50 inside the housing 80.

The electrode layer 90 is disposed on the upper clad layer 40 adjacent to the prism 60. An insulting layer 44 may be disposed between the electrode layer 90 and the upper clad layer 40. The insulating layer 44 and the electrode layer 90 may support the housing 80. The insulating layer 44 may be disposed on the outskirt of the prism 60.

The housing 80 may cover the prism 60 and the optical device 70. The prism 60 and the optical device 70 may be fixed on the substrate 10 by the filling adhesives 82 inside the housing 80. The optical device 70 of VCSEL may be protected by the housing 80. The housing 80 may have a rectangular plane which extends in a direction perpendicular to the extended direction. The housing 80 may cover some of the electrode layer 90. The electrode layer 90 may be connected from the inside to the outside of the housing 80. The electrode layer 90 inside the housing 80 may be electrically interconnected with the optical device 70 by the first boding wire 79. Accordingly, the optical module 100 according to an embodiment of the inventive concept may improve reliability on the electrical interconnection.

The electrode layer 90 outside the housing 80 may be electrically interconnected with the pad 92 by the second wire bonding 94. The pad 92 may be disposed on the upper clad layer 40 adjacent to the electrode layer 90 and the insulating layer 44. The pad 92 may be electrically interconnected with an external electromagnetic device.

As described above, the optical device 70 of VCSEL may provide the laser light 140 to the optical waveguide 30. The laser light 140 may travel at an angel of refraction which increases from the prism 60 to the optical waveguide 30.

Every time the laser light 140 travels from a medium having a high refractive index to a medium having a low refractive index, an angle of refraction thereof may increase. When the angle of refraction is 90 degrees at the optical waveguide 30, the first optical sources 72 and the optical waveguide 30, and the second optical source 78 and the optical waveguide 30 in the optical module 100 may have maximum coupling efficiency. The laser light 140 may be incident on the inclined surface 62 of the prism 60 perpendicularly. That is, a first incident angle $\Phi_1$ of the laser light 140 on the prism 60 is 0. Also, a first angle of refraction (not shown) on the inclined surface 62 is 0. The laser light is incident from a medium having a low refractive index on a medium having a high refractive index, the angle of refraction becomes smaller than the incident angle. The laser light 140 may be incident on the prism 60 from the air.

Then, the laser light 140 may travel to the bottom of the prism 60 at a second incident angle $\Phi_2$. The second incident angle $\Phi_2$ is the same as the inclination θ of the inclined surface 62 of the prism 60. The laser light 140 may be refracted at a second angle of refraction angle $\Phi_3$ in the buffer layer 50. The second angle of refraction $\Phi_3$ may be larger than the second incident angle $\Phi_2$. When an optical signal is incident from a medium having a high refractive index on a medium having a low refractive index, an angle of refraction may become larger than an incident angle. The laser light 140 may travel at a third angle of refraction $\Phi_4$ in the optical waveguide 30. The third angle of refraction $\Phi_4$ may larger than the second angle of refraction $\Phi_3$.

The laser light 140 may have maximum coupling efficiency at the third angle of refraction $\Phi_4$ of about 90 degrees. At this time, the laser light may travel transversely. When the third angle of refractive angle $\Phi_4$ is greater or smaller than 90 degrees, the laser light 140 may be reflected and returned towards a direction of the optical device 70 from the bottom. That is, the coupling efficiency may be lowered.

Figure 5:
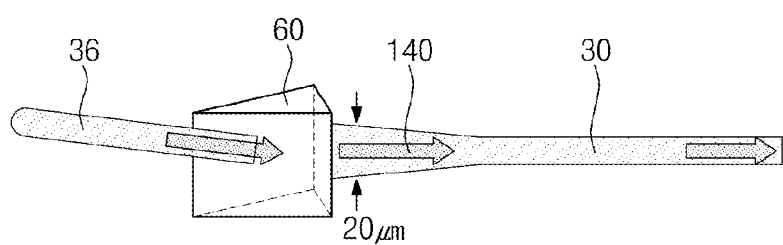
FIG. 5 is a plan view illustrating an optical module using an optical fiber.
Figure 6:
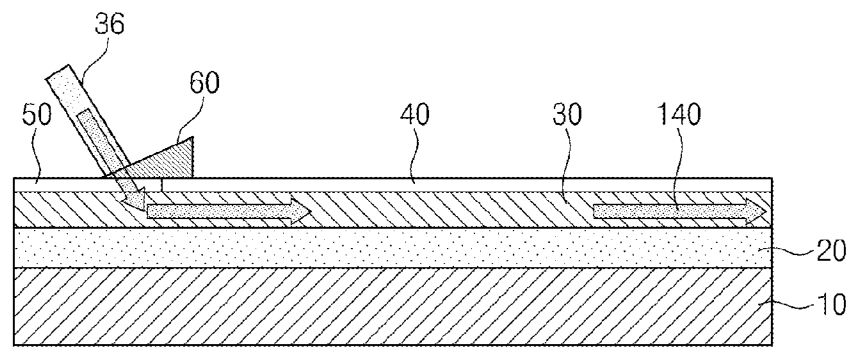
FIG. 6 is a plan view of FIG. 5.

FIG. 5 is a plan view illustrating an optical module 100 using the optical fibers 36. FIG. 6 is a plan view of FIG. 5.

Referring to FIGS. 5 and 6, the optical fibers 36 may be employed instead of the optical devices 70 of the optical module 100. The optical fibers 36 may be coupled to the inclined surface of the prism 60. The optical waveguide 30 may have a linewidth of about 20 μm under the prism 60. The optical waveguide 30 may be tapered, as it is farther away from the prism 60. Here, the optical module 100 according to an embodiment of the inventive concept may be an optical fiber connector.

Figure 7:
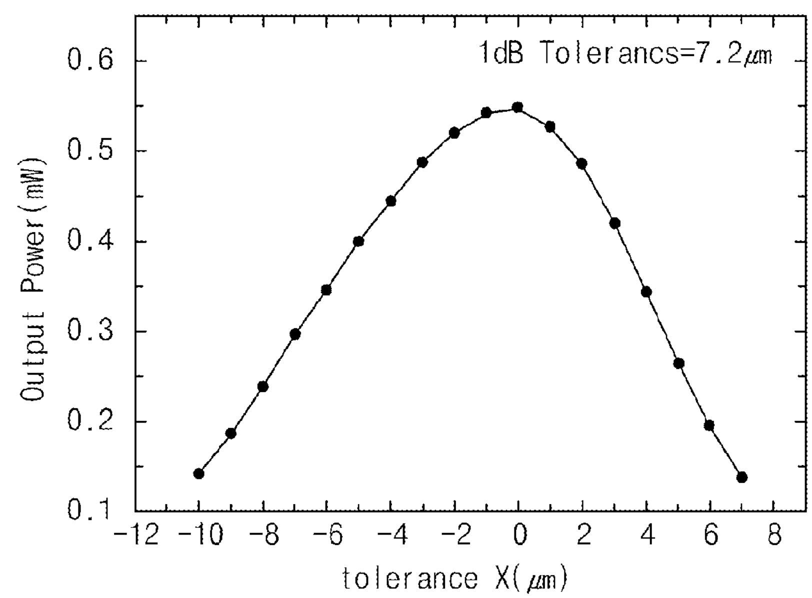
FIGS. 7 and 8 are graphs representing strengths of output powers according to planar alignment tolerance errors of an optical fiber and an optical waveguide.
Figure 8:
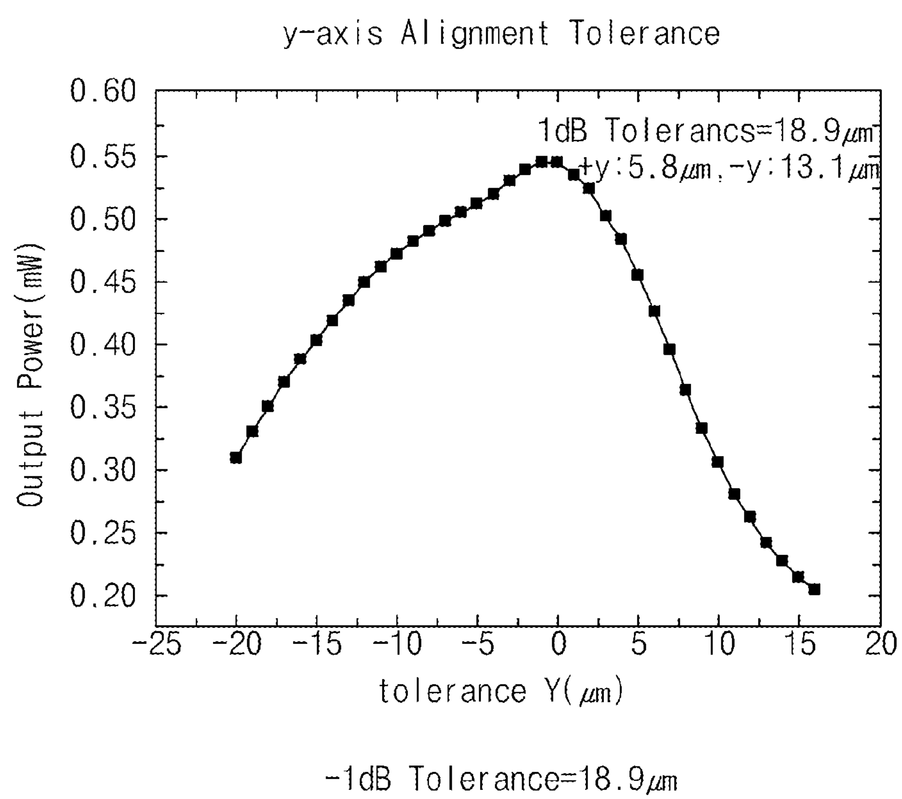

FIGS. 7 and 8 represent strengths of output powers according to planar alignment tolerance errors of the optical fibers 36 and the optical waveguide 30.

Referring to FIGS. 7 and 8, the optical waveguide 30 having about 20 μm linewidth is tapered to about 7.21 μm linewidth as it is farther away from the prism 60, and may have about 18.9 μm thickness. The prism 60 may have an inclination angle of maximum coupling efficiency according to material thereof. For example, the prism 60 of crystalline silicon may have an inclination angle of about 25 to about 35 degrees. For example, when the inclined surface of the prism 60 of crystalline silicon has an inclination angle of about 29.6 degrees, the optical module 100 according to an embodiment of the inventive concept may have maximum coupling efficiency. The prism 60 of gallium phosphide (GaP) may have about 30 to about 40 degree inclination angle. Table 1 shows output powers of a laser light according to an inclination angle of the prism 60 of GaP.

TABLE 1

| Inclination angle of GaP prism (degree) | Output power (mW) |
|---|---|
| 35.06 | 0.801 |
| 35.2 | 0.810 |
| 35.35 | 0.804 |
| 35.5 | 0.706 |

Referring to Table 1, when the inclined surface of the prism of GaP has about 35.2 degree inclination angle, the maximum output power is 0.810 mW. Accordingly, the optical module 100 of an embodiment of the inventive concept may have maximum coupling efficiency.

In addition, the first photo detectors 74 or the second photo detectors 76 may detect the laser light delivered from the optical waveguide 30. The laser light 140 may travel at a reduced angle of refraction from the optical waveguide 30 to the prism 60. Every time the laser light 140 travels from a medium of a low refractive index to a medium of a high refractive index, the angle of refraction thereof may be reduced. When the angel of refraction of the laser light 140 is 0 degree in the prism 60, the optical waveguide 30 and the first photo detector 74 or the optical waveguide 30 and the second photo detector 76 may have maximum coupling efficiency. Detailed description about the travel of the laser light 140 is omitted.

Figure 9:
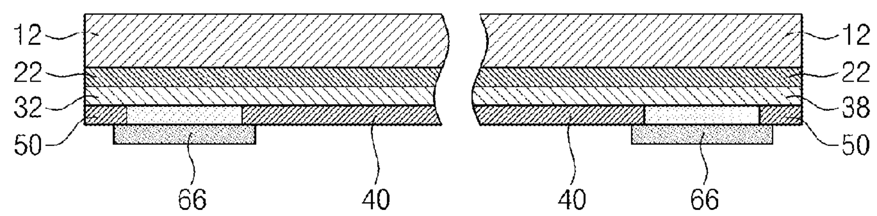
FIG. 9 is a cross-sectional view illustrating the optical connector of FIG. 1.
Figure 10:
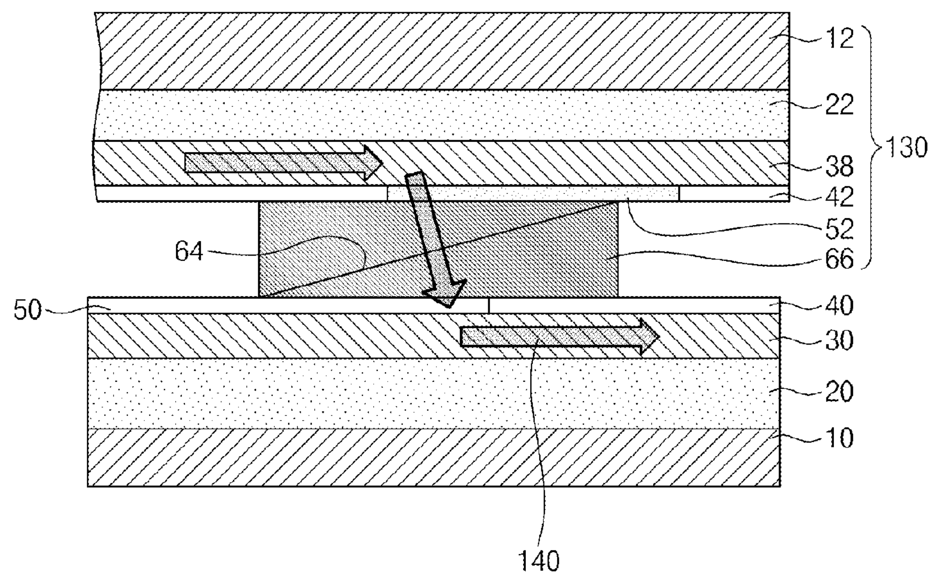
FIG. 10 is a cross-sectional view illustrating in detail an upper substrate and a hexahedral prism of FIG. 9.

FIG. 9 is a cross-sectional view illustrating the optical connector 130 of FIG. 1. FIG. 10 is a cross-sectional view illustrating in detail an upper substrate 12 and a hexahedral prism 66.

Referring to FIGS. 1, 9 and 10, the optical connector 130 according to an embodiment of the inventive concept may include the hexahedral prism 66, an upper buffer layer 52, a top upper clad layer 42, an upper optical waveguide 38, a top lower clad layer 22, and the upper substrate 12.

The upper substrate 12, the top lower clad layer 22, the upper optical waveguide 38, the top upper clad layer 42, and the upper buffer layer 52 may be disposed to be symmetric with the substrate 10, the lower clad layer 20, the optical waveguide 30, the upper clad layer 40, and the buffer layer 50, respectively, with respect to the hexahedral prism 66.

The upper substrate 12 may include the same crystalline silicon as that of the substrate 10. The top lower clad layer 22 and the top upper clad layer 42 may include silicon oxide. The upper waveguide 38 may include silicon nitride or silicon oxynitride. The upper buffer layer 52 may include index matching oil or adhesives.

The hexahedral prism 66 may have lower and upper surfaces which are parallel to the optical waveguide 30 and the upper optical waveguide 38. The hexahedral prism 66 in FIGS. 9 and 10 appears to have a rectangular cross section. The rectangular cross section may have a diagonal line 64. The diagonal line 64 may correspond to the inclined surface 62 of the prism 60. That is, the hexahedral prism 66 may correspond to one that a plurality of wedge-shaped prisms 60 are combined.

The laser light 140 may be refracted to travel from the upper optical waveguide 38 to the optical waveguide 30. After increasing from the upper waveguide 38 to the hexahedral prism 66 along a travel direction of the laser light 140, the refractive index decreases again from the hexahedral prism 66 to the optical waveguide 30. The hexahedral prism 66 having coupling efficiency may have an arbitrary linewidth and height. When the linewidth of the height of the hexahedral prism 66 are adjusted properly, the laser light 140 may travel between the upper optical waveguide 38 and the optical waveguide 30 without reflection loss.

Figure 11:
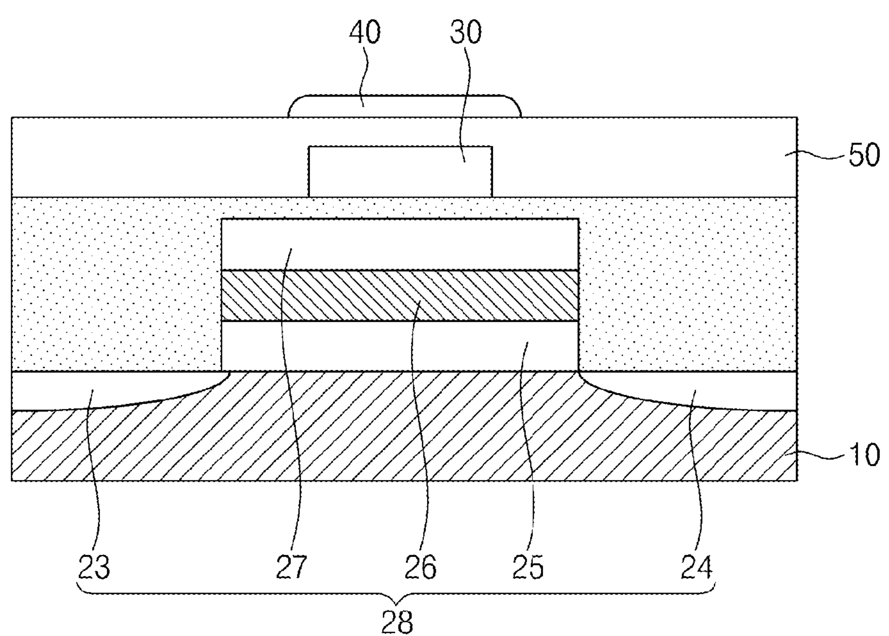
FIG. 11 is a cross-sectional view illustrating a semiconductor device in a lower clad layer.

FIG. 11 is a cross-sectional view illustrating semiconductor devices 28 in the lower clad layer 20.

Referring to FIG. 11, the optical module 100 may include semiconductor devices 28 between the lower clad layer 20 and the substrate 10. The semiconductor devices 28 may include a memory, such as DRAM or NAND flash, or a thin film transistor. The semiconductor devices 28 of the thin film transistor may include a source 23, the drain 24, the gate insulating layer 25, a gate 26, and a gate top portion insulating layer 27. The source 23 and the drain 24 may be disposed on the top surface of the substrate 10. The source 23 and the drain 24 may be separated from each other. The gate insulating layer 25, the gate 26, and the gate top portion insulating layer 27 may be stacked on the substrate 19 between the source 23 and the drain 24. When a control voltage is applied to the gate 26, a channel (not shown) may be formed as a depletion region in the substrate 10 between the source 23 and the drain 24. Accordingly, the source 23 and the drain 24 may be turned on. Although not shown in the drawing, the semiconductor devices 28 of the thin film transistor may be connected to word lines and data lines (bit lines) in the lower clad layer 20. The word lines and the data lines may be extended in different directions from each other.

Figure 12:
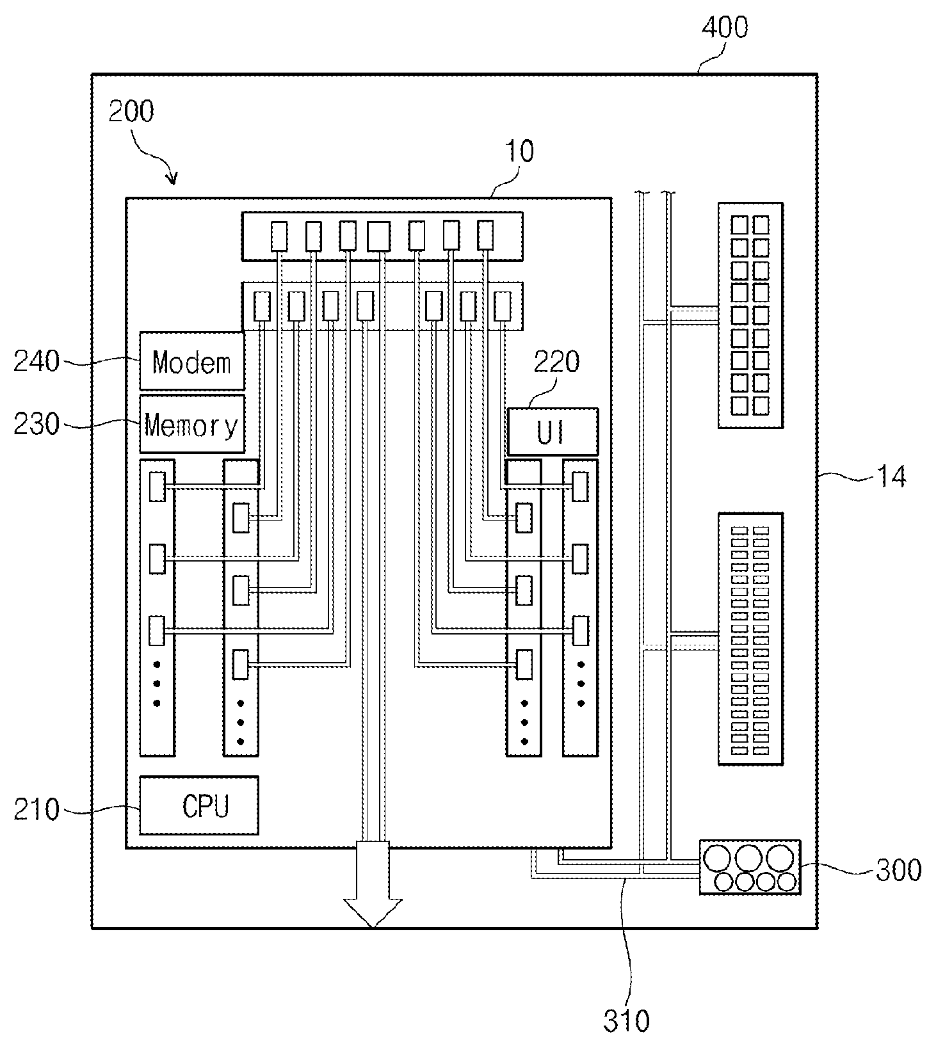
FIG. 12 illustrates an information processing system according to an application example of the present invention.

FIG. 12 illustrates an information processing system 400 according to an application example of the present invention. The information processing system 400 according to an application of the present invention may include a printed circuit board (PCB) 14, electromagnetic devices 300, and an optical communication apparatus 200. The PCB 14 may have the electromagnetic devices 300, electric interconnections 310, sockets 320, and the optical communication apparatus 200 mounted therein. For example, the electromagnetic devices 300 may be disposed on one side of the PCB 14, and the optical communication apparatus 200 may be disposed on the other side of the PCB 14. The electric interconnections 310 may connect the electromagnetic devices 300 and the optical communication apparatus 200 on the PCB 14. The sockets 320 may connect input/output units (not shown) outside the PCB 14. The input/output units may include a keyboard or a monitor.

The optical communication apparatus 200 may have a central processing unit 210, a user interface 220, a memory 230, and a modem 240 mounted therein. The central processing unit 210, the user interface 220, the memory 230, and the modem 240 may transmit and receive an optical signal through the optical devices 70. The optical signal may be delivered through the optical waveguides 30. Here, the optical waveguides 30 may be a bus commonly connected to the central processing unit 210, the user interface 220, the memory 230, and the modem 240. The central processing unit 210 may calculate and process data received from the electromagnetic devices 300, the user interface 220, and the memory 230 or the modem 240. The user interface 220 may provide a user environment. The memory 230 stores data processed by the central processing unit 210 or externally input. The memory 230 may include a main storage unit, such as a DRAM, or an SRAM, or an auxiliary storage unit, such as a hard disk, or a solid state disk (SSD). The modem 240 may allow the information processing system 400 to access the ultra-high speed internet or the optical communication internet. Although not shown in the drawing, it is obvious to those skilled in the art that the information processing system 400 according to an application example of the present invention may further include an application chipset, a camera image processor (CIS), and an input/output device. Also, the information processing system 400 may correspond to a computer or a mobile device. In FIG. 12, the optical communication apparatus 200 is disclosed to have the central processing unit 210, the user interface 220, the memory 230, and the model 240 mounted therein on the basis of the unit cells 114 (see FIG. 2), but it may be variously changed in the present invention.

An optical module according to an embodiment of the inventive concept may include a substrate, a lower clad layer, an optical waveguide, an upper clad layer, a buffer layer, a prism, an optical device, an electrode layer, and bonding wires. The lower clad layer may be disposed on the substrate. The optical waveguide may include silicon nitride or silicon oxynitride which is extended in one direction on the lower clad layer. The upper clad layer may be disposed on the optical waveguide and the lower clad layer. Some of the optical waveguide may be exposed from the upper clad layer. The buffer layer may be disposed on the optical waveguide exposed from the upper clad layer. The buffer layer may have a higher refractive index than the optical waveguide. The prism on the buffer layer may include silicon having a higher refractive index than the optical waveguide. The prism may have a wedge shape including an inclined surface. The optical device may include an optical source providing a laser light. The optical device is coupled to the inclined surface to allow the laser light to be incident perpendicularly to the inclined surface. The laser light travels at an angle of refraction which gradually increases from the prism to the optical waveguide. When the angle of refraction of the laser light in the optical waveguide is 90 degrees, the optical waveguide and the optical device may have maximum coupling efficiency. The maximum coupling efficiency may be determined by refractive indexes of the optical waveguide, the buffer layer and the prism, and the inclination angle of the prism. The prism can increase optical coupling of the optical device and the optical waveguide. Also, the prism can increase alignment tolerance range of the optical device and the optical waveguide.

A housing may cover the prism and the optical device. The prism and optical device may be fixed by adhesives filling in the housing. The housing and the adhesives can reduce a package cost and improve production yield. The electrode layer may be disposed on the upper clad layer which is adjacent to the prism. The electrode layer may support the housing and be extended to the inside and outside of the housing. The bonding wires may connect the optical device and the electrode layer inside the housing. The electrode layer and the bonding wires may join the optical device inside the housing from the outside of the housing. The electrode layer outside the housing may be connected to an external electromagnetic device by means of the bonding wires. Accordingly, an optical module, an optical communication apparatus, and an information processing system including the same, according to an embodiment of the inventive concept can improve reliability of electrical and optical interconnections.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An optical module comprising:

a lower clad layer;

an optical waveguide including silicon nitride, the optical waveguide extending in an extending direction on the lower clad layer;

an optical device on the optical waveguide;

a prism disposed between the optical device and the optical waveguide, the prism having a higher refractive index than the optical waveguide;

a housing covering the prism and the optical device; and an electrode layer adjacent to the prism and disposed between the housing and the optical waveguide, wherein the prism has a wedge shape including an inclined surface with respect to the extending direction of the optical waveguide, the prism including gallium phosphide, and wherein the inclined surface of the prism has an inclination angle of about 35.2 degree with respect to the extending direction of the optical waveguide.

2. The optical module of claim 1, further comprising bonding wires connecting the electrode layer and the optical device.

3. The optical module of claim 2, wherein the optical device is coupled to an inclined surface of the prism and the optical device includes a vertical cavity surface emitting laser (VCSEL) or a photo diode.

4. The optical module of claim 3, wherein the optical device is disposed adjacent to the prism and includes bonding pads connected to the bonding wires.

5. The optical module of claim 1, further comprising an upper clad layer disposed between the optical waveguide and the electrode layer.

6. An optical module comprising:

a lower clad layer;

an optical waveguide including silicon nitride, the optical waveguide extending in an extending direction on the lower clad layer;

an optical device on the optical waveguide;

a prism disposed between the optical device and the optical waveguide, the prism having a higher refractive index than the optical waveguide;

a housing covering the prism and the optical device; and an electrode layer adjacent to the prism and disposed between the housing and the optical waveguide, wherein the prism has a wedge shape including an inclined surface with respect to the extending direction of the optical waveguide, the prism including crystalline silicon, and wherein the inclined surface of the prism has an inclination angle of about 29.6 degree with respect to the extending direction of the optical waveguide.

7. An optical module comprising:

a lower clad layer;

an optical waveguide including silicon nitride, the optical waveguide extending in an extending direction on the lower clad layer;

an optical device on the optical waveguide;

a prism disposed between the optical device and the optical waveguide, the prism having a higher refractive index than the optical waveguide;

a housing covering the prism and the optical device; and an electrode layer adjacent to the prism and disposed between the housing and the optical waveguide, such that the electrode layer comes in contact with a bottom of a sidewall of the housing to support the housing, and the electrode layer extends from an inside of the housing to an outside of the housing.

8. The optical module of claim 7, further comprising filling adhesives which fill an inner space of the housing.

* * * * *